(12) United States Patent
Koide

(10) Patent No.: US 11,774,822 B2
(45) Date of Patent: Oct. 3, 2023

(54) LIQUID CRYSTAL DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/844,104

(22) Filed: Jun. 20, 2022

(65) Prior Publication Data

US 2022/0404656 A1 Dec. 22, 2022

(30) Foreign Application Priority Data

Jun. 22, 2021 (JP) ................. 2021-103006

(51) Int. Cl.
*G02F 1/1368* (2006.01)
*G02F 1/1362* (2006.01)

(52) U.S. Cl.
CPC ...... *G02F 1/1368* (2013.01); *G02F 1/136254* (2021.01)

(58) Field of Classification Search
CPC .................................................... G02F 1/1368
See application file for complete search history.

(56) References Cited

U.S. PATENT DOCUMENTS

2007/0164954 A1* 7/2007 Yang ................. G02F 1/136286
345/88
2009/0268298 A1* 10/2009 Lee .......................... H01J 9/205
156/60
2014/0375910 A1* 12/2014 Tada ..................... G06F 3/0446
349/12
2017/0124977 A1 5/2017 Suzuki et al.
2017/0235182 A1 8/2017 Abe et al.
2018/0136524 A1* 5/2018 Ikegami ............ G02F 1/133514
2019/0310511 A1* 10/2019 Yamamoto ........ G02F 1/133512
2020/0168633 A1* 5/2020 Ina ........................ H01L 27/124

FOREIGN PATENT DOCUMENTS

CN 114420024 * 4/2022 ............... G09G 3/00
JP 2017-083759 A 5/2017
JP 2017-146450 A 8/2017

* cited by examiner

*Primary Examiner* — Sang V Nguyen
(74) *Attorney, Agent, or Firm* — Michael Best & Friedrich LLP

(57) ABSTRACT

The purpose of the present invention is to realize a structure that the testing terminals are remained in the final product in the liquid crystal display device having a variant display area. The structure of the present invention is as follows. The display area is variant, the outer shapes of the counter substrate 200 and the TFT substrate are also variant similar to the display area. The terminal area formed on the TFT substrate has a straight first area, a second area and a third area; the second area and the third are bent from the first area and formed at sides of the first area. A plurality of terminals to drive the liquid crystal display device exist in the first area, and a plurality of terminals for testing the liquid crystal display device exist in the second area and the third area.

12 Claims, 12 Drawing Sheets

LIQUID CRYSTAL DISPLAY DEVICE

CLAIM OF PRIORITY

The present application claims priority from Japanese Patent Application JP 2021-103006 filed on Jun. 22, 2021, the content of which is hereby incorporated by reference into this application.

BACKGROUND OF THE INVENTION

(1) Field of the Invention

The present invention relates to a display device, specifically to a liquid crystal display device having variant display area.

(2) Description of the Related Art

A liquid crystal display device has a structure including the TFT substrate, in which the pixels having the pixel electrodes and the TFTs (Thin Film Transistor) are arranged in matrix, the counter substrate opposing to the TFT substrate, and a liquid crystal layer sandwiched between the TFT substrate and the counter substrate. A light transmittance of each of the pixels is controlled by liquid crystal molecules in each of the pixels; thus, images are formed.

Liquid crystal display devices are now being used in various area since liquid crystal display devices can be made small and light. The liquid crystal display device has a rectangular display area in general; however, in recent years, a demand for the liquid crystal display device having a display area of not rectangular shape (it may be called as variant display area in this specification) is increasing. Those usages are, for example, in-vehicle display devices, VR (Virtual Reality) display devices, display devices for watches, and so forth.

Patent document 1 discloses driving method and layout which are suitable for the display area of not rectangular. On the other hand, especially in a small display device, it is also necessary to make a terminal area smaller. Patent document 2 discloses a structure of terminal area for grounding the outer surface of the counter substrate in the IPS mode liquid crystal display device.

PRIOR ART REFERENCE

Patent Document

Patent document 1: Japanese patent application laid open No. 2017-083759
Patent document 2: Japanese patent application laid open No. 2017-146450

SUMMARY OF THE INVENTION

Display devices for a VR, a watch and so forth have approximately circular display areas. It is preferable for such devices to have a circular outer shape. A terminal area also becomes smaller in such a small liquid crystal display device. Terminal wirings, terminals for video signals, a driver IC, testing wirings, an earth electrode to give ground potential to the outer surface of the counter substrate are located in the terminal area.

If the outer shape of the liquid crystal display device is rectangular, it is rather easy to locate those elements in the terminal area; however, if the outer shape becomes circular or variant shape of e.g. polygon, it becomes difficult to provide a space in the display area to locate those elements. Since testing terminals and testing wirings are used mainly in the manufacturing process, a part of the terminal area for those elements can be cut away; however, in such a counter measure, there arises a problem of cost for cutting off those areas and also a problem that quality check cannot be performed after the product is completed.

A purpose of the present invention is to overcome the above explained problems and to realize a structure that the testing terminals and the testing wirings are remained in the terminal area; in addition, terminals for signals, terminals for power and so forth are also remained in the terminal area of the display device having variant display area or variant outer shape.

The present invention solves the above explained problems; the representative structures are as follows.

(1) A liquid crystal display device including a TFT substrate and a counter substrate, a display area formed in an area in which the TFT substrate and the counter substrate overlap each other, and a terminal area formed on the TFT substrate on which the counter substrate is not overlapped; in which the display area is variant, an edge of the terminal area has a first edge 610 apart from the counter substrate in a first direction and extending in a second direction in straight, a second edge 620 is located in a first side from the first edge 610, and having a first angle 650 with respect to the second direction, a third edge 630 is located in a second side from the first edge 610, and having a second angle 660 with respect to the second direction, a first area is defined as an area between the first edge 610 and a fourth edge 710 of the counter substrate, a second area is defined as an area between the second edge 620 and a fifth edge 720 of the counter substrate, a third area is defined as an area between the third edge 630 and a sixth edge 730 of the counter substrate, a plurality of first terminals align in the second direction along the first edge in the first area, a plurality of second terminals exist in the second area, a plurality of third terminals exist in the third area, the plurality of the first terminals are to drive the liquid crystal display device, and the plurality of the second terminals and the plurality of the third terminals are to test the display area of the liquid crystal display device with a test image. The above numerical numbers correspond to the numerical numbers in FIG. 3. The first direction corresponds to y direction in FIG. 3 and the second direction corresponds to x direction in FIG. 3.

(2) The liquid crystal display device according to (1), in which an outer shape of the counter substrate is variant similar to the display area.

(3) The liquid crystal display device according to (1), in which an outer shape of the TFT substrate is variant similar to the display area.

DETAILED DESCRIPTION OF THE PREFERRED EMBODIMENTS

The present invention is explained concretely in the following embodiment. A term of variant shape may be used for a shape of not rectangular. The structure of four sides with large corner R as exemplified in embodiment 4 also may be called as a variant shape.

Embodiment 1

Figure 1:
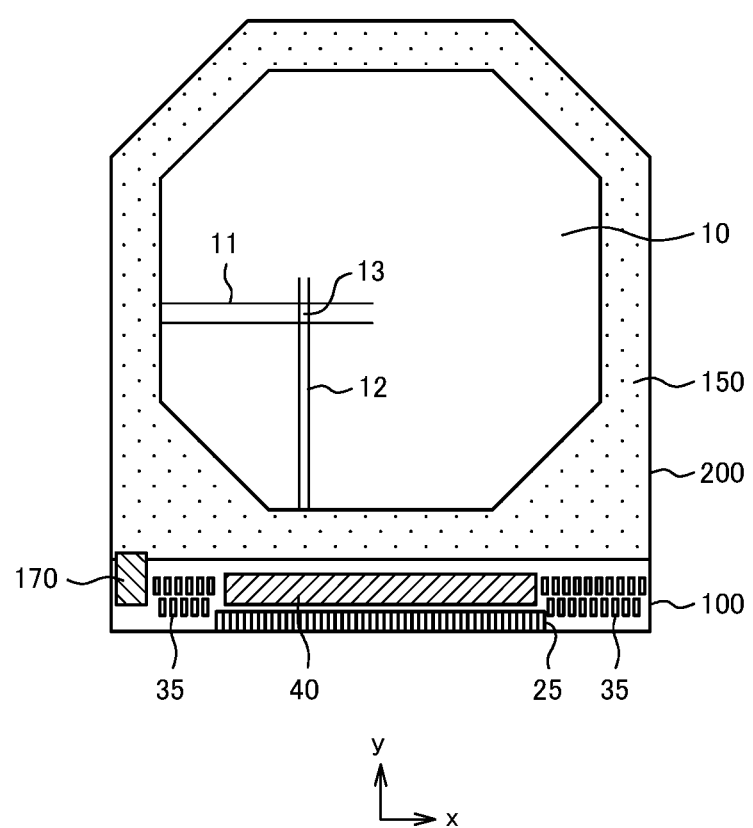
FIG. 1 is a comparative example of a liquid crystal display device having a variant display area.

FIG. 1 is a liquid crystal display device which has a display area 10 of octagon, which is close to a circle. Such a liquid crystal display device is used for a watch, a VR display device and so forth. In FIG. 1, the display area 10 is formed at an area in which a TFT substrate 100 of hexagon and a counter substrate 200 of hexagon overlap each other. Scanning lines 11 extend in the lateral direction (the x direction) and are arranged in the vertical direction (the y direction); video signal lines 12 extend in the vertical direction and are arranged in the lateral direction. A pixel 13 is formed in an area surrounded by the scanning lines 11 and the video signal lines 12.

A terminal area is formed in an area in which the TFT substrate 100 does not overlap the counter substrate 200. In the terminal area, in addition to terminal wirings, a driver IC 40, connection terminals 25 for a flexible wiring substrate, which is not shown, are located. Further, testing terminals 35, testing wirings, an earth electrode, and a conductive member 170 formed on the earth electrode to connect the transparent conductive film on the surface of the counter substrate 200 to ground are located in the terminal area. The testing terminals 35 and the testing wirings are large in numbers because they display images in the display area to find whether defects exist or not before the driver IC 40 is installed. The situation is the same even when the driver IC 40 is installed on the flexible wiring substrate. The reason is that the testing terminals are used for testing display images before the driver IC 40 is connected to the connecting terminals 25 through the flexible wiring substrate even when the driver IC 40 is installed on the flexible wiring substrate.

As described above, various elements are located in the terminal area, thus the terminal area is made rectangular to secure a space for those elements. However, if the terminal area is made rectangular, even when the shape of the display area is octagon, the outer shape of the display device becomes hexagon, which is very different from the shape of the display area 10. The display device of such outer shape is not easy to be installed in the product; in addition, it is not easy to make the frame area narrow in a product of watch, and so forth, further it is not preferable in terms of design.

Figure 2:
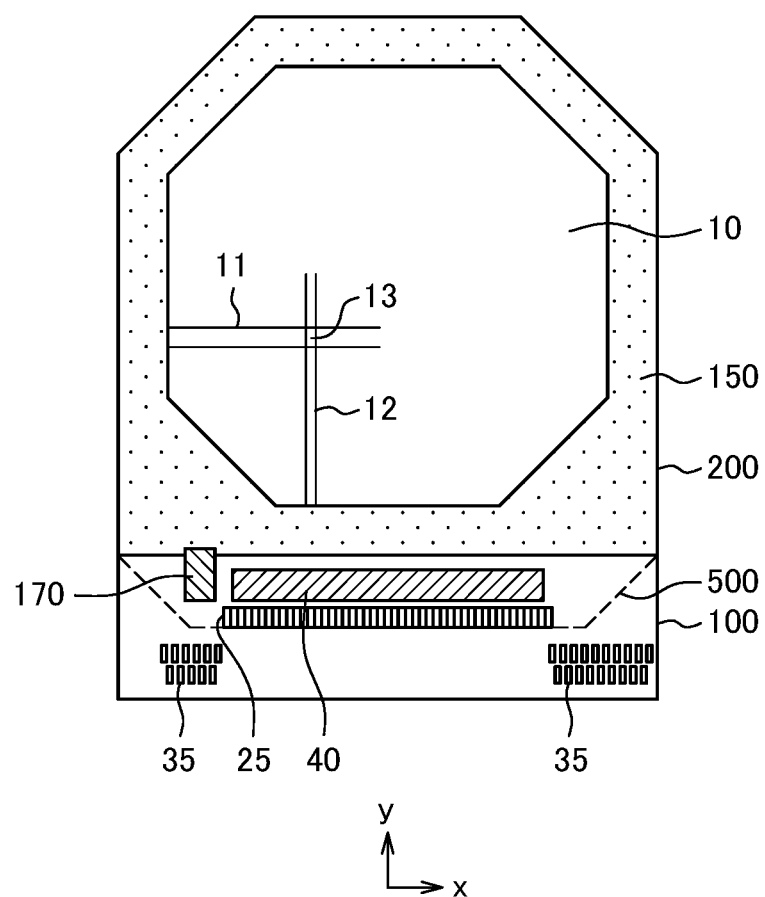
FIG. 2 is another comparative example of a liquid crystal display device having a variant display area.

By the way, since the testing terminals 35 in FIG. 1 are to test whether defects exist or not on the display panel before the driver IC 40 is installed, they are not indispensable after the driver IC 40 is installed. Thus, the structure exemplified by FIG. 2 is conceivable. That is to say, the testing terminals 35 are located below the connection terminals 25 in the y direction; the testing terminals 35 are cut away as depicted by broken line 500 in FIG. 2 after the liquid crystal display device is completed.

This method, however, needs an additional process of cutting away a part of the terminal area. In addition, there could arise a necessity to retest the display area 10 for some reason even after the driver IC 40 is installed; however, it is impossible after the testing terminals 35 are cut away.

Figure 3:
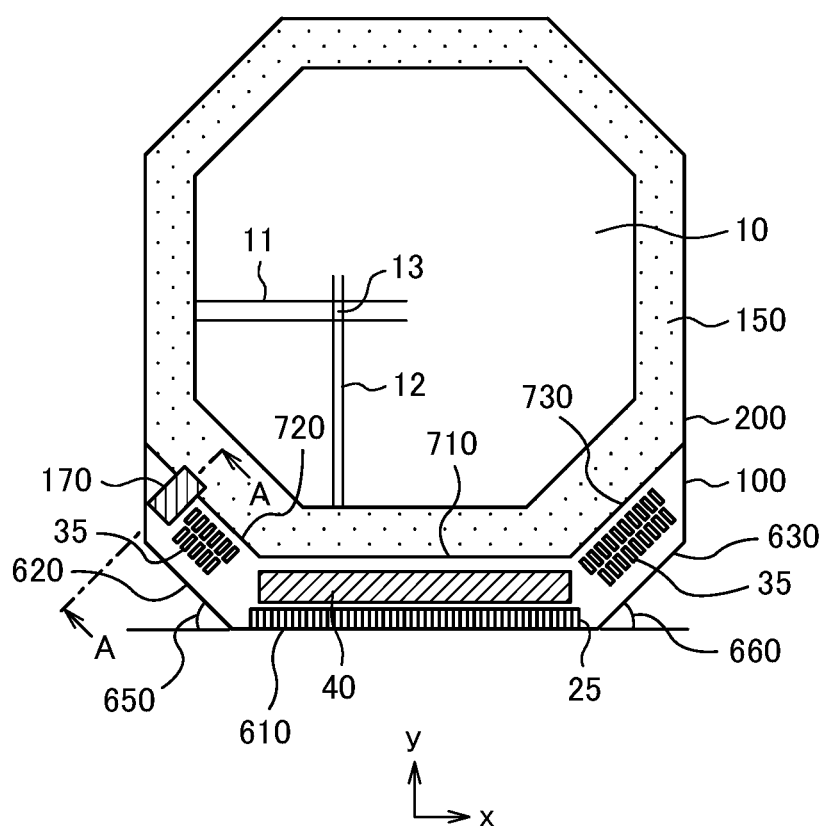
FIG. 3 is an example of the liquid crystal display device according to embodiment 1.

FIG. 3 is a plan view of embodiment 1 of the present invention, which overcomes the above explained problem. In FIG. 3, the counter substrate 200 and the TFT substrate 100 are octagon corresponding to the display area 10. Therefore, the structure of FIG. 3 provides a narrow frame region and makes it easy for a liquid crystal display panel to be installed in the product.

In FIG. 3, the terminal area is not rectangular, but is bent at both sides with a certain angle with respect to the y direction or the x direction. In other words, the terminal area is formed along three sides of the counter substrate 200 or the TFT substrate 100.

In FIG. 3, a plurality of connecting terminals 25, through which signals or powers are input to drive the liquid crystal display device, the driver IC 40, testing terminals 35 and the conducting member 170, which is to ground the shield electrode formed on the outer surface of the counter substrate 200, are located. The connecting terminals 25 are arranged in line on a first line in the x direction near the edge of the TFT substrate 100. The driver IC 40 is set above the connecting terminals 25 in the y direction in parallel with the aligned direction of the connecting electrodes 25.

In FIG. 3, the testing terminals 35 and the conductive member 170 are located in a bent area from the first line. Many testing terminals 35 exist; at least a part of them are formed above the upper long side of the driving IC 40 in the y direction. In other words, the driver IC 40 is rectangular in a plan view having a long side in the x direction and a short side in the y direction; at least a part of the testing terminals 35 exist above, in the y direction, the upper long side of the driving IC 40. The plurality of the testing terminals 35 are located above, in the y direction, the first line in which the plurality of connecting terminals 25 are aligned.

In FIG. 3, the conducive member 170 for grounding is formed near an edge of the counter substrate 200 or TFT substrate 100 in the x direction in the bent terminal area in a plan view, however, the position for the conductive member 170 is not limited to the above position. As will be explained later, a liberty for location of the conductive member can be secured by e.g. adopting a two level crossing with the testing wirings using the same insulating film formed by the simultaneous manufacturing process as in the display area 10.

Figure 4:
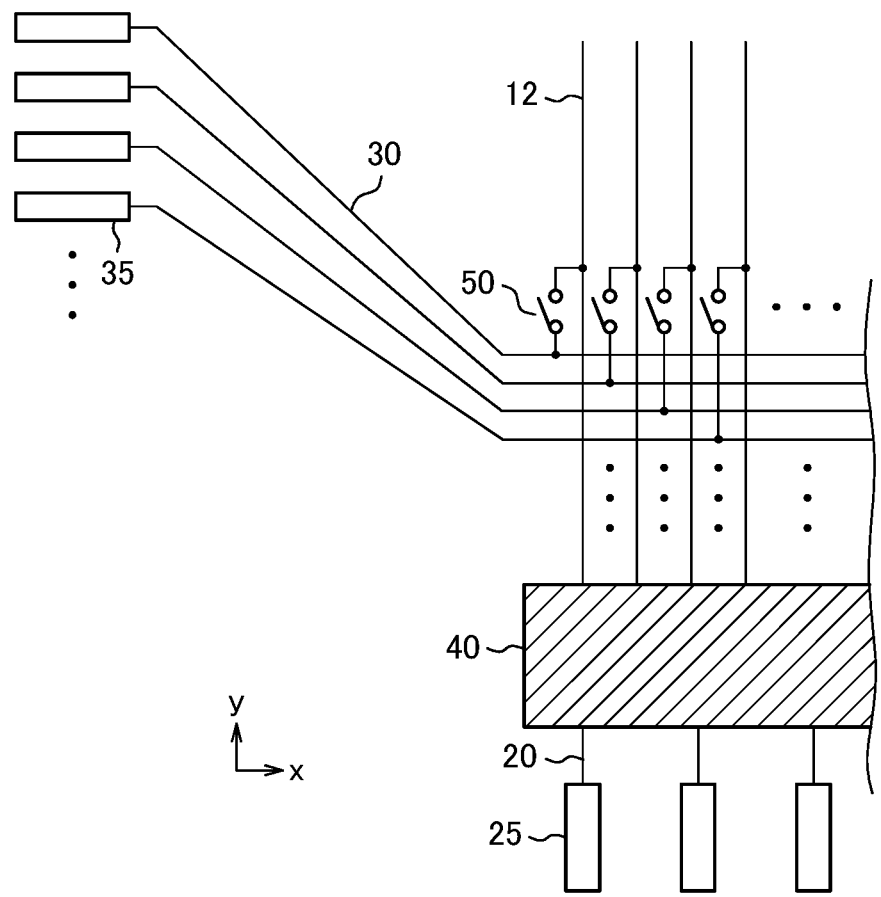
FIG. 4 is an example of a testing circuit according to embodiment 1.

FIG. 4 is a circuit diagram to explain functions of the video signal lines 12, the driver IC 40, the terminal wirings 20, connecting terminals 25, the testing terminals 35 and so forth corresponding to FIG. 3. The video signal lines 12 extend in the y direction and are arranged in the x direction. The video signal lines 12 extending from the display area 10 are connected to the driver IC 40. In the meantime, in an actual device, a pitch of the video signal line 12 in the driver IC 40 is smaller than a pitch of the video signal lines 12 in the display area 10, therefore, inclined wirings are formed in the middle, however, since FIG. 4 is a model diagram, the video signal lines 12 are depicted as straight lines.

The connecting terminals 25 are formed below the driver IC 40 in the y direction. Video signals, scanning signals, clock signals, powers and the like are supplied from the connecting terminals 25. Even though the video signals are supplied from the connecting terminals, data for one scanning line are formed by parallel serial conversion in the driving circuit in the driver IC 40; thus the number of the connecting terminals 25 is much smaller than the number of the video signal lines 12. If the terminals connected to the connecting terminals 25 are called input terminals, and the terminals connected to the video signal lines 12 are called output terminals in the driver IC 40, the number of the output terminals is much larger than the number of the input terminals.

In FIG. 4, the testing wirings 30 branch off from the video signal lines 12 through selecting switches 50. The testing wirings 30 are connected to the testing terminals 35 located in left side. The testing terminals 35 exist in the bending portion of the terminal area depicted in FIG. 3. The selecting switches 50 can be formed by TFT (Thin Film Transistor). The number of the selecting switches 50 is the same as the number of video signal lines 12.

The purpose of the inspection is to check whether defects exist in the liquid crystal display panel or not by forming a display image in the display area 10 before the driver IC 40 is connected. This means the same number of the testing terminals 35 is necessary as the number of the video signal lines 12, however, it is impossible to locate such large number of testing terminals 35 in the terminal area. On the other hand, only testing images are necessary to display in the test; thus the number of the testing wirings 30 and the testing terminals 35 are decreased by supplying the same signals to several video signal lines 12. In FIG. 4, the testing wirings 30 extend not only in the direction to the testing terminals 35 (left hand side in the x direction) but also extend to the right hand side in the x direction to be connected with video signal lines 12 in the right hand side. If the number of the video signal lines 12 in which the same signal is input is n, the number of the testing terminals 35 becomes 1/n of the number of the video signal lines 12.

In FIG. 4, in a plan view, there are many terminals under the driver IC 40 to be connected to the video signal lines 12. Therefore, sizes and pitches of the output terminals of the IC deriver 40 are very small. On the other hand, the testing terminals 35 need to contact the testing probes, therefore, certain sizes and pitches are necessary for the testing terminals 35. Consequently, an area for the testing terminals 35 tend to be large. In the present invention, as depicted in FIG. 4, the testing terminals 35 are not aligned with the driver IC 40 or connecting terminal 25, but they are located at upper position in the y direction in FIG. 4, or in referring to FIG. 3, they are located at the bending portion of the terminal area; thus necessary space can be secured for the testing terminals 35.

Figure 5:
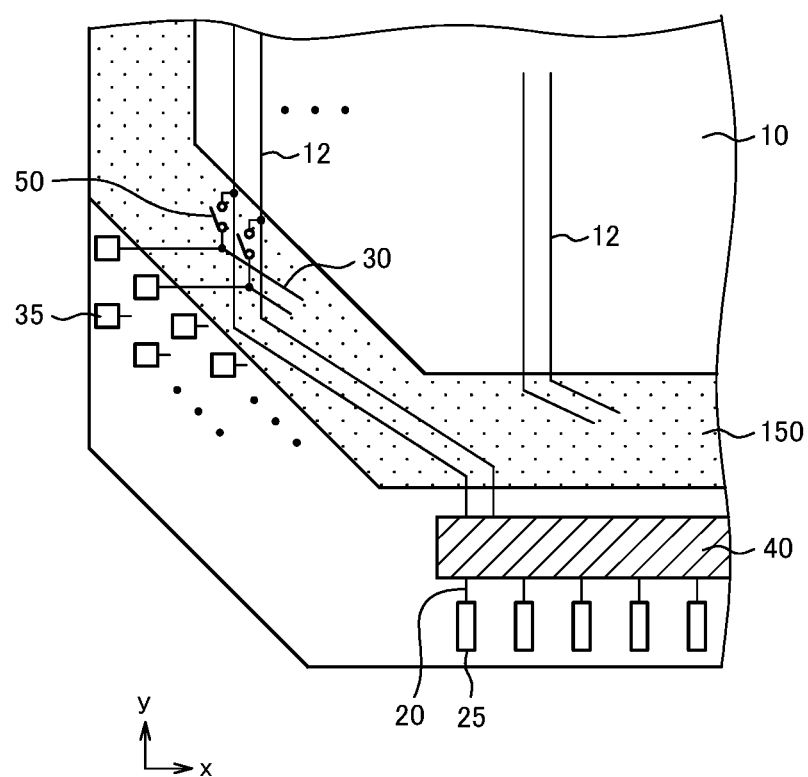
FIG. 5 is another example of the testing circuit according to embodiment 1.

FIG. 5 is a plan view in which the testing wirings 30, the testing terminals 35, the video signal lines 12, terminal wirings 20, connecting terminals 25, and so forth of FIG. 4 are located in actual layout in similar to the liquid crystal display device of FIG. 3. In FIG. 5, the outer shape of the counter substrate 200 is polygon approximately similar to the display area 10; the outer shape of the TFT substrate 100 is also approximately similar polygon. The TFT substrate 100 and the counter substrate 200 are adhered by the seal material 150 formed at an edge of the counter substrate 200 with certain width. The TFT substrate 100 on which the counter substrate 200 does not overlap is a terminal area; the terminal area has bending portions, which has certain angles with the x direction and the y direction at both sides.

The video signal lines 12 extend to bottom in the y direction from the display area 10. Since the width of the display area 10 in the x direction is larger than the width of the driver IC 40 in the x direction, the video signal lines 12 bend in the middle, and are connected to the driver IC 40 through inclined wring portions. The bending portions of the video signal lines 120 are located in the area on which the seal material 150 is formed.

In FIG. 5, the testing wirings 30, which are branched off from the video signal lines 12 through the selecting switches 50, extend as crossing the video signal lines 12. The testing wirings 30 extend in left hand side to be connected with the testing terminals 35 formed in the bending portion of the terminal area. The testing wirings 30 extend also to right hand side in the x direction, and are connected with other plurality of video signal lines 12 through selecting switches 50 to decrease the number of the testing terminals 35 and the testing wirings 30.

In FIG. 5, the selecting switches 50 can be formed by TFT, therefore, necessary space is small. In addition, only one gate wiring is necessary for the TFTs as the selecting switches. As shown in FIG. 5, the testing terminals 35 are located in the bending portion of the terminal area. Therefore, those testing terminals 35 can be remained in the final products. In addition, the outer shape of the liquid crystal display panel, which is the same as the outer shape of the TFT substrate 100, can be approximately similar to the display area 10; therefore, installing of the liquid crystal panel into the final product is easy.

Figure 6:
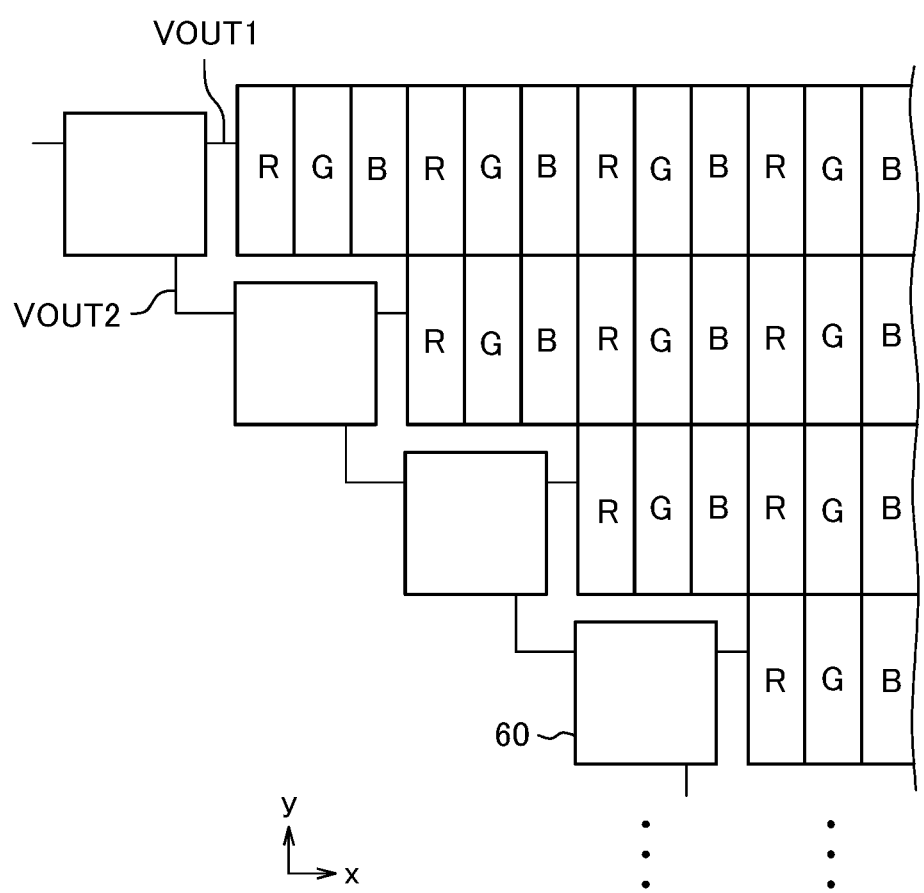
FIG. 6 is an example of a scanning line driving circuit.

Many scanning lines 11 extend in the lateral direction and are arranged in longitudinal direction in the display area 10. However, scanning signals supplied to the scanning lines 11 are generated in the shift resister, thus, many terminals as for the video signal lines 12 are not necessary. FIG. 6 is a plan view which shows a model of relation between the display area 10 at the bending portion and the shift resister.

R, G and B in FIG. 6 mean Red pixel, Green pixel and Blue pixel, respectively. In FIG. 6, the scanning line is provided in every line, scanning signals are supplied from unit circuits 60 which constitute the shift resister. In FIG. 6, VOUT1 means a scanning signal supplied form the unit circuit 60; VOUT2 is a signal to start the unit circuit 60 of the following step.

Figure 7:
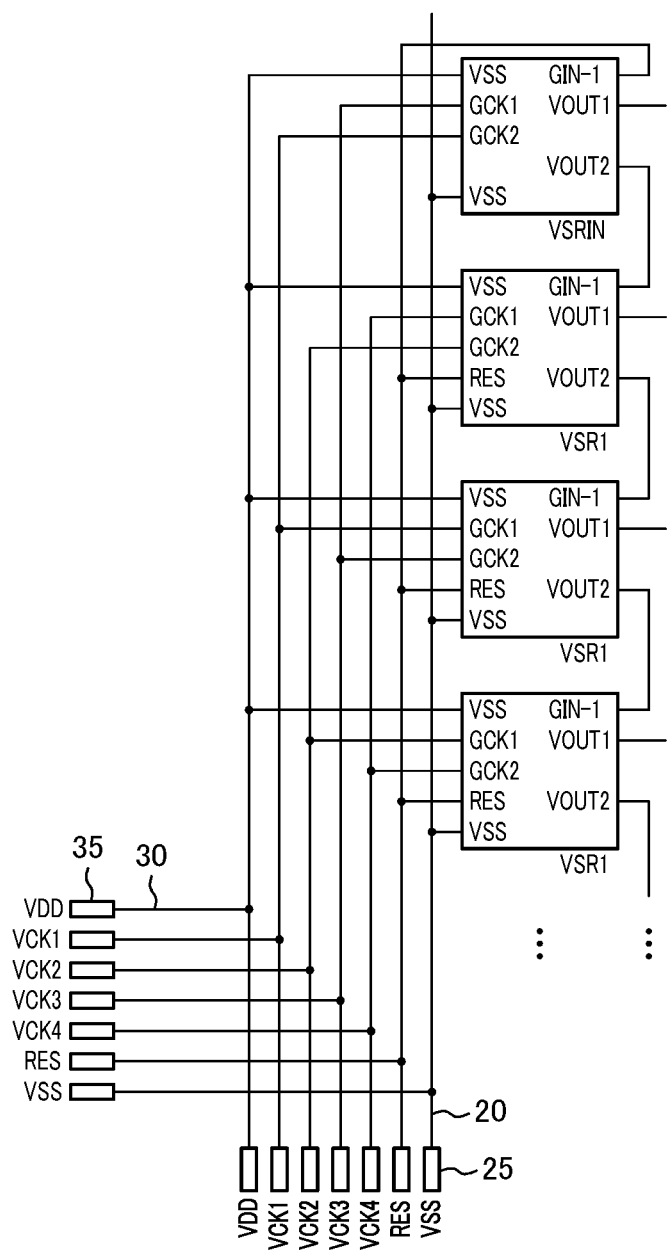
FIG. 7 is a concrete example of the scanning line driving circuit.

FIG. 7 is a circuit diagram of shift resistor of FIG. 6. FIG. 7 is an example of scanning line driving circuit which has 4 phase clocks. In FIG. 7, the scanning line signal is generated from upper side to lower side in order. In FIG. 7, the unit circuit 60 in the first step is VSRIN, and unit circuit 60 VSR1 is repeated in the second step and below. In FIG. 7, RES signal is supplied to GIN-1 terminal as a start pulse. In FIG. 7, VOUT2 of previous step is supplied to GIN-1 terminal of second step and below. Clock pulses of different phase are supplied to VCK1, VCK2, VCK3, and VCK4 terminals. VDD and VSS are terminals for powers.

As described above, since the scanning line driving circuit does not need many terminals, it is possible to use the terminals for the final product as testing terminals. By the way, the terminals in the final product, including the terminals for the scanning line driving circuit, except the testing terminals, are connected with the flexible wiring substrate. Therefore, there is a chance that a terminal pitch for the scanning line driving circuit becomes very small to adapt to the terminal pitch of flexible wiring substrate, consequently, touching by testing probes becomes difficult. In that case, it is possible to branch off the testing wirings 30 from each of the wirings which are connected to the unit circuit 60, and provide the testing terminals 35.

In this case, if the shape of the liquid crystal display panel is like FIG. 3, the testing terminals 35 for driving the shift resister can be located in the bending portion of the terminal area of FIG. 3.

Embodiment 2

Generally, a liquid crystal display device has a problem in viewing angle characteristics, however, the IPS (In Plane Switching) mode liquid crystal display device has improved viewing angle characteristics. In the IPS mode, a comb shaped pixel electrode and a plane shaped common electrode are formed on the TFT substrate 100, namely, the common electrode does not exist on the counter substrate 200. As a result, noise penetrates the inside of the liquid crystal display panel from the side of counter substrate 200, consequently, quality of images is deteriorated. In order to counter measure this problem, a transparent conducive film (it may be called as a shield electrode 210, herein after) formed from e.g. ITO (Indium Tin Oxide) is formed on the outside of the counter substrate 200, and a ground potential is applied to the transparent conductive film 210 to shield inside of the liquid crystal display panel.

In order to apply a ground potential to the outside of the counter substrate 200, an earth electrode 80 is formed on the terminal area of the TFT substrate 100, and the earth electrode 80 and the shield electrode 210 formed on the counter substrate 200 are connected through the conductive member 170. For example, silver paste or conductive tape are used for the conductive member 170. In FIG. 3 and the like, only the conductive member 170 is depicted. Actually, however, the earth electrode 80 exists under the conductive member 170.

Figure 8:
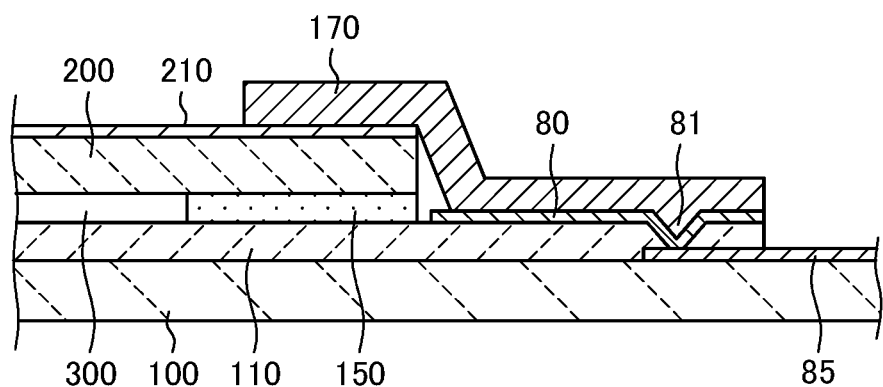
FIG. 8 is an example of a cross sectional view of the structure of the earth electrode and its vicinity.

FIG. 8 is a cross sectional view along the line A-A in FIG. 3, namely, a cross sectional view of the portion at the earth electrode 80. In FIG. 8, the TFT substrate 100 and the counter substrate 200 adhere to each other through the seal material 150; the liquid crystal 300 is sandwiched between the TFT substrate 100 and the counter substrate 200.

Actually, many layers are formed on the TFT substrate 100 and the counter substrate 200; however, those layer are omitted in FIG. 8. Only organic passivation film 110 is depicted on the side of the TFT substrate 100. On the TFT substrate 100, the organic passivation film 110 is formed thick as 2 to 4 microns because the organic passivation film 110 is used as a flattening film. The transparent conductive film 210 for shield is formed on the outside of the counter substrate 200.

The feature of FIG. 8 is that the organic passivation film 110 extends to outside of the seal material 150, and the earth electrode 80 is formed on the organic passivation film 110. The metal oxide conductive film as ITO and the like, which are chemically stable, is used for the earth electrode 80. The transparent conductive film 210 formed on the outside of the counter substrate 200 and the earth electrode 80 are electrically connected to each other by conductive member 170.

In FIG. 8, the earth electrode 80 is connected with the earth wiring 85 formed on the TFT substrate 100 via the through hole 81 formed in the organic passivation film 110. In the meantime, the organic passivation film 110, on which the earth electrode 80 is formed, is continuously formed from the organic passivation film 110 in the display area 10 in FIG. 8, however, the organic passivation film 110 can be separated between inside of the seal material 150 and outside of the seal material.

Figure 9:
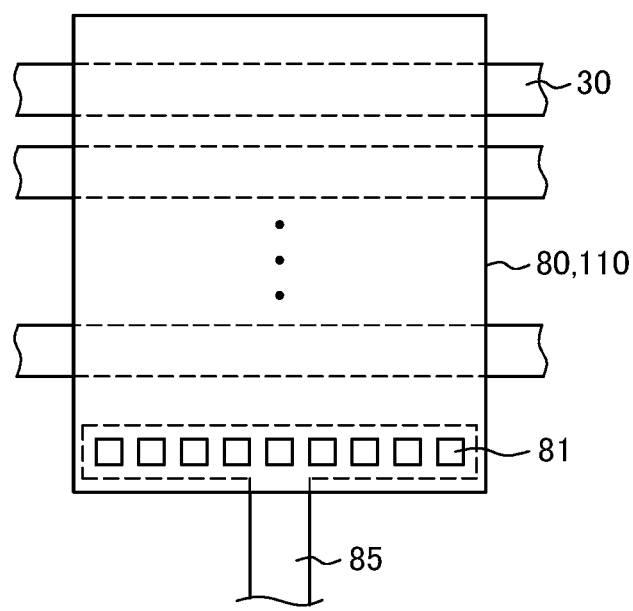
FIG. 9 is an example of a plan view of the structure of the earth electrode and its vicinity.

In FIG. 8, since the earth electrode 80 is formed on the organic passivation film 110, necessary wirings can be formed under the earth electrode 80. FIG. 9 is an example in which testing wirings 30 pass under the organic passivation film 110. In FIG. 9, a plurality of the testing wirings 30 extend in a direction crossing the extending direction of the earth wiring 85 under the organic passivation film 110, namely, under the earth electrode 80.

Figure 10:
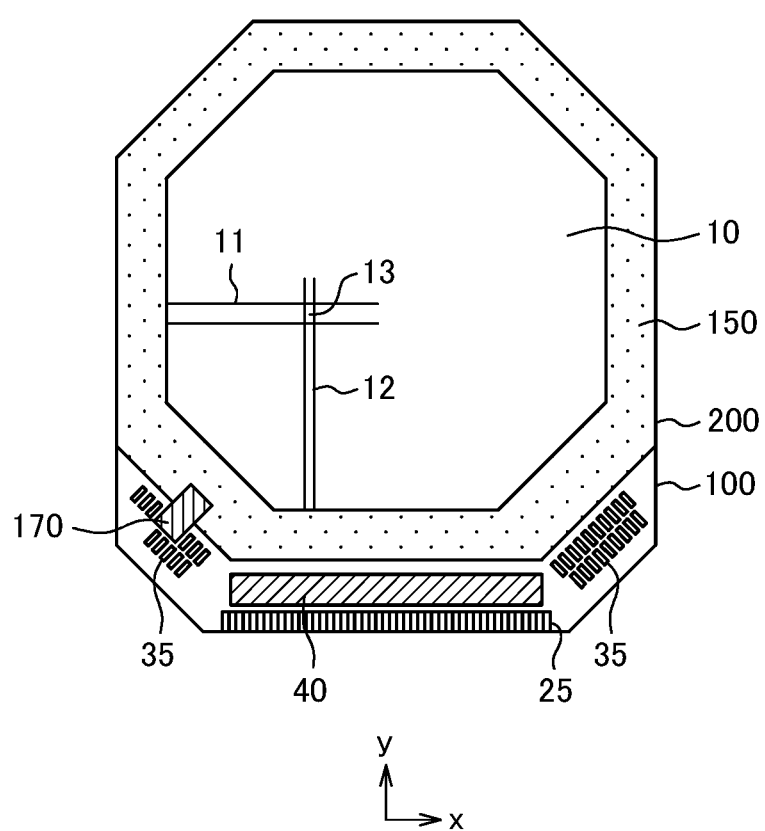
FIG. 10 is a plan view of an example of embodiment 2.

The earth electrode 80 and the conductive member 170 are located in the corner of the terminal area in FIG. 3, however, if the structure of FIG. 9 is adopted, the earth electrode 80 and the conductive member 170 can be located in any position. FIG. 10 is one example of that. FIG. 10 is the same as FIG. 3 except the position of the earth electrode 80 and the conductive member 170. In FIG. 10, the earth electrode 80 is located inner side in the x direction in the bending portion of the terminal area. The earth electrode 80 and the conductive member 170 are located between the testing terminals 35 in a plan view.

When the earth electrode 80 is laid out in such position, there arises a problem of routing of the testing wirings 30; however, the structure of FIG. 9 can avoid the earth electrode 80 from being an obstruction to a layout of the testing wirings 30. As described above, the earth electrode 80 can be located in any place in the terminal area according to a need of layout by adopting the structure of FIG. 9. In addition, the straight line, along which the connection electrode 25 and the driving IC 40 are located, can be made shorter by locating the earth electrode 80 in the bending portion of the terminal area; consequently, the outer shape of the TFT substrate 100 can be further made similar to the shape of the display area 10.

Embodiment 3

Figure 11:
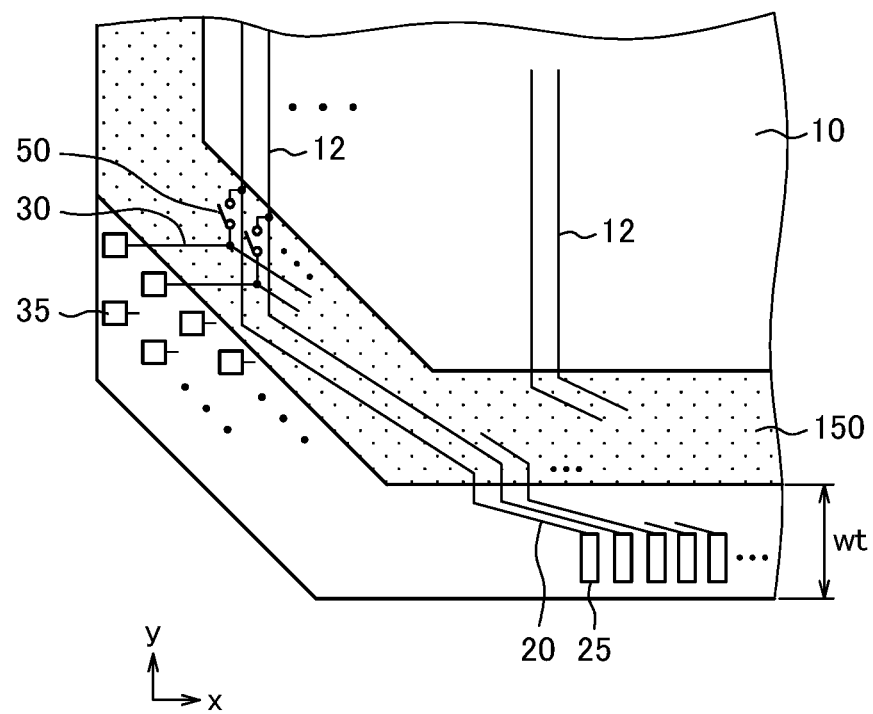
FIG. 11 is a circuit diagram according to embodiment 3.

FIG. 11 is a plan view of embodiment 3. FIG. 11 differs from FIG. 5 of embodiment 1 in that the diver IC 40 does not exist in the terminal area. In this case, the drier IC 40 is installed on the flexible wiring substrate. Even in such a case, too, a check is necessary whether defects exist in the display panel or not before the flexible wiring substrate is connected.

The structure of FIG. 11 is adopted when a width wt of the terminal area in the y direction is made smaller. The width wt of the terminal area in the y direction is made smaller by eliminating the driver IC 40 from the terminal area; however, the number of the connecting terminals 25 increases greatly compared with the structure of FIG. 5. Principally, the connecting terminals 25 are necessary as the same number of the video signal lines 12. Therefore, a width of the total connecting terminals 25 aligned in the x direction becomes large. In addition, since the connecting terminals 25 are very small, the testing probe cannot be adapted.

In FIG. 11, the terminal area is bent, and the testing terminals 35 are located in the bending portion, therefore, increased connecting terminals 25 can be overcome. In FIG. 11, the testing wirings 30 branching off from the video signal lines 12 through the selecting switches 50 to be connected to the testing terminals 35 is the same as explained in FIGS. 4 and 5. In the terminal area, the video signal lines 12 are directly connected with the connecting terminals 25. Other structures are the same as explained in FIGS. 4 and 5.

The scanning lines 11, the scanning line driving circuit 60, earth electrode 80 and the like are also the same as explained in embodiment 1 and embodiment 2. Since a width of the terminal area is small in embodiment 3, the earth electrode 80 of embodiment 2 has a large merit because testing wirings 30 can pass under the earth electrode 80.

Embodiment 4

Figure 12:
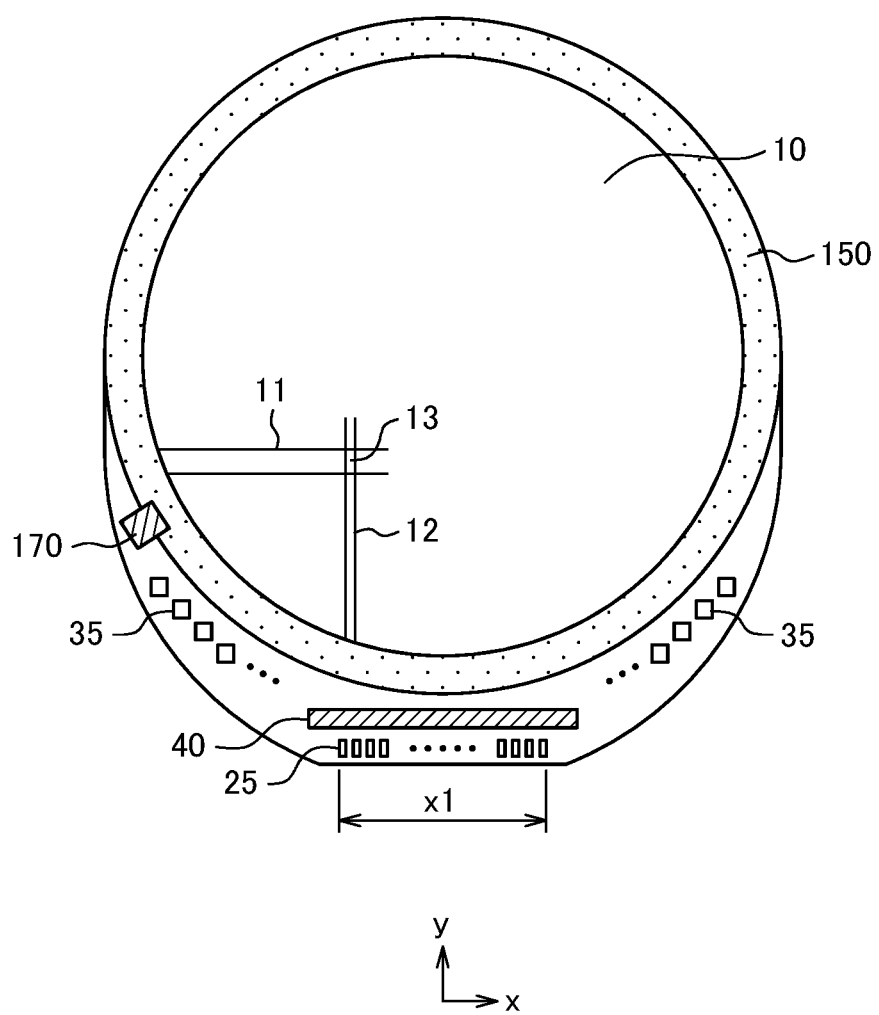
FIG. 12 is a plan view which shows an example of a liquid crystal display device according to embodiment 4.

FIG. 12 shows an example when the display area 10 is circle. The display area 10 is formed in the area in which the TFT substrate 100 and the counter substrate 200 overlap. The outer shape of the counter substrate 200 is a circle larger than the circle of the display area 10. The TFT substrate 100 and the counter substrate 200 adhere to each other by the ring shaped seal material 150, and the liquid crystal is sealed thereinside. The TFT substrate 100 is oval, elongated in the y direction, since the terminal area cannot be formed if the TFT substrate 100 and the counter substrate 200 are the same size. In other words, TFT substrate 100 is race track shaped in which a length in the y direction is a little bit longer than a length in the x direction.

The connecting terminals 25 align in line in the x direction. A width of aligned terminals 25 is x1 in total. The TFT substrate 100 has a straight line of length x1 in parallel with the connecting terminals 25. If the length of x1 is large, the outer shape of the TFT substrate 100 deviates from the circle, thus, x1 should be limited so that a deviation from the circle is not conspicuous. In FIG. 12, the driver IC 40 is located between the display area 10 and the connecting terminal array 25.

In FIG. 12, the testing terminals 35 are located above the driver IC 40 in the y direction, and outside the driver IC 40 in the x direction. The relations among the video signal lines 12, the testing wirings 30, the testing terminals 35, the driver IC 40, the terminal wirings 20, the connecting terminals 25 and the like are the same as explained in FIG. 4 of embodiment 1. The scanning wiring line driving circuit side is also the same as explained in FIGS. 6 and 7. The location of the earth electrode 80 and the conductive member 170 is the same as explained in embodiment 2. Further, the structure in a case when the driver IC 40 is installed on the flexible wiring substrate is the same as explained in embodiment 3.

In FIG. 12, the shapes of the display area 10 and the counter substrate 200 are circles, however, they need not limited to circle. They can be elliptical, or a part of the display area 10 can be parabola, hyperbola, or elliptical. In addition, the display area 10, the counter electrode 200, the TFT substrate 100 and the like can be a race track shape, which is a combination of a straight line and a circle. The features in those cases are the same as explained in FIG. 12. That is to say, the connecting terminals 25 align in line in the x direction in the terminal area of the TFT substrate 100; the edge of the terminal area is straight line in length of x1 in parallel with the connecting terminal array 25. The both sides outside of the strait line of the terminal area bend in a curve.

Figure 13:
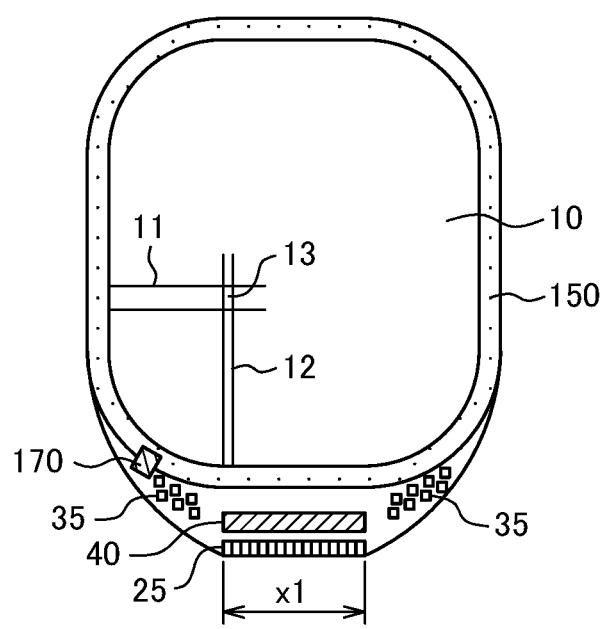
FIG. 13 is a plan view which shows another example of a liquid crystal display device according to embodiment 4.

FIG. 13 is an example that the display area 10 resembles to rectangular as a whole, but corners have a large radius of curvature. Such shape is also called variant shape in the present specification. The outer shape of the counter substrate 200 also is variant shape formed along the display area 10 and having a large radius of curvature in the corners. In FIG. 13, the counter substrate 200 and the TFT substrate 100 adhere to each other by the seal material 150; the display area 10 is formed in the area in which the counter substrate 200 and the TFT substrate 100 overlap; the terminal area is formed in the area in which TFT substrate 100 does not overlap the counter substrate 200.

The lower edge of the terminal area in the y direction is constituted by a straight line and a first curved portion on the left and a second curved portion on the right. When the area between the straight line and the counter substrate 200 is defined as a first area, a plurality of connecting terminals 25 are aligned in the x direction in a range of x1 in the edge of the first area. In a plan view, the driver IC 40 is located in a space between the plurality of connecting terminals 25 and the counter substrate 200. In the meantime, the driver IC 40 may not exist in the terminal area as explained in embodiment 3.

In FIG. 13, the area between the first curve and the counter substrate 200 is defined as a second area; and the area between the second curve and the counter substrate 200 is defined as a third area. The testing terminals 35 are located in the second area and the third area. The earth electrode 80, which supplies a ground potential to the outer surface of the counter substrate 200, is formed in the second area.

In FIG. 13, the testing terminals 35 are located above the connecting terminals 25 in the y direction. The testing terminals 35 are located above the driving IC 40 in the y direction. As shown in FIG. 13, many testing terminals 35 are located in the second area and the third area, thus, the product can be tested even after the product is completed according to necessity using the testing terminals 35.

What is claimed is:

1. A liquid crystal display device comprising a TFT substrate and a counter substrate,
   a display area formed in an area in which the TFT substrate and the counter substrate overlap each other, and
   a terminal area formed on the TFT substrate on which the counter substrate is not overlapped,
   wherein the display area is variant,
   an edge of the terminal area has a first edge of the TFT substrate apart from the counter substrate in a first direction and extending in a second direction in straight,
   a second edge of the TFT substrate is located in a first side from the first edge, and having a first angle with respect to the second direction,
   a third edge of the TFT substrate is located in a second side from the first edge, and having a second angle with respect to the second direction,
   a first area of the TFT substrate is defined as an area between the first edge of the TFT substrate and a fourth edge of the counter substrate,
   a second area of the TFT substrate is defined as an area between the second edge of the TFT substrate and a fifth edge of the counter substrate,
   a third area of the TFT substrate is defined as an area between the third edge of the TFT substrate and a sixth edge of the counter substrate,
   a plurality of first terminals is provided in the first area and aligns in the second direction along the first edge,
   a plurality of second terminals is provided in the second area,
   a plurality of third terminals is provided in the third area,
   the plurality of the first terminals is to drive the liquid crystal display device, and
   the plurality of the second terminals and the plurality of the third terminals are to test the display area of the liquid crystal display device with a test image.

2. The liquid crystal display device according to claim 1, wherein an outer shape of the counter substrate is variant similar to the display area.

3. The liquid crystal display device according to claim 1, wherein an outer shape of the TFT substrate is variant similar to the display area.

4. The liquid crystal display device according to claim 1, wherein an outer shape of the counter substrate is polygon of pentagon or more, and
the first edge of the terminal area is parallel to a first side of the polygon.

5. The liquid crystal display device according to claim 4, wherein a second side of the counter substrate, the second side contacting the first side at one side, contacts the second area of the terminal area, and
a third side of the counter substrate, the third side contacting the first side at another side which is opposite side to the one side, contacts the third area of the terminal area.

6. The liquid crystal display device according to claim 4, wherein the polygon is octagon.

7. The liquid crystal display device according to claim 1, wherein a transparent conductive film is formed on an outer surface of the counter substrate, and
an electrode to be connected with the transparent conductive film is formed in the second area or the third area of the terminal area of the TFT substrate.

8. The liquid crystal display device according to claim 7, wherein the electrode is located in between the plurality of testing terminals in a plan view, and
a plurality of testing wirings which are connected with the plurality of testing terminals pass under the electrode.

9. The liquid crystal display device according to claim 1, wherein the counter substrate is circle, and
the TFT substrate is race track shaped.

10. The liquid crystal display device according to claim 1, wherein the counter substrate has a first straight side, a first round corner and a second round corner,
the TFT substrate has a second straight side, a third round corner and a fourth round corner,
the first area of the terminal area is formed between the first straight side of the counter substrate and the second straight side of the TFT substrate,
the second area of the terminal area is formed between the first round corner and the third round corner, and
the third area of the terminal area is formed between the second round corner and the fourth round corner.

11. The liquid crystal display device of claim 1, wherein the TFT substrate includes a plurality of video signal lines in the display area,
a testing wiring is pulled out from one of the second terminals or one of the third terminals, and
the testing wiring crosses the plurality of video signal lines outside of the display area.

12. The liquid crystal display device of claim 11, wherein the testing wiring is connected to at least one of the plurality of video signal lines via a selecting switch.

* * * * *